(12) United States Patent
Ishikawa

(10) Patent No.: US 7,239,187 B2
(45) Date of Patent: Jul. 3, 2007

(54) RESET CIRCUIT AND DIGITAL COMMUNICATION APPARATUS

(75) Inventor: Yasuaki Ishikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 88 days.

(21) Appl. No.: 11/255,958

(22) Filed: Oct. 24, 2005

(65) Prior Publication Data

US 2006/0033541 A1    Feb. 16, 2006

Related U.S. Application Data

(63) Continuation of application No. PCT/JP2004/005859, filed on Apr. 23, 2004.

(30) Foreign Application Priority Data

Apr. 25, 2003    (JP)    ............................ 2003-121721

(51) Int. Cl.
*H03L 7/00*    (2006.01)
(52) U.S. Cl. ...................... 327/143; 327/198
(58) Field of Classification Search ............... None
See application file for complete search history.

(56) References Cited

U.S. PATENT DOCUMENTS 5,912,570 A *    6/1999  Kuusisto .................... 327/142

6,388,399 B1 *    5/2002  Eckel et al. ................. 315/312

FOREIGN PATENT DOCUMENTS

| JP | 63-261448 A | 10/1988 |
|---|---|---|
| JP | 4-218822 A | 8/1992 |
| JP | 5-119871 A | 5/1993 |
| JP | 6-175751 A | 6/1994 |
| JP | 7-319588 A | 12/1995 |
| JP | 10-97340 A | 4/1998 |
| JP | 10-289031 A | 10/1998 |
| JP | 11-150451 A | 6/1999 |
| JP | 2002-108510 A | 4/2002 |
| JP | 2002-189706 A | 7/2002 |
| JP | 2003-273716 A | 9/2003 |

* cited by examiner

*Primary Examiner*—Tuan T. Lam
(74) *Attorney, Agent, or Firm*—Sughrue Mion, PLLC

(57) ABSTRACT

There is provided a reset circuit in which the necessity for adjusting the constant of the pull-up resistor of the reset trigger signal is eliminated to assure a reliable reset operation. The reset circuit has another function to cancel the reset, even when clocks are stopped on power up. During the normal operation, a clock stop detection signal CALMB takes on the level 'H' so that a reset trigger signal CPURSTB is masked by an OR gate circuit 8. If the clocks are stopped during the normal operation, and the clock stop detection signal CALMB is 'L', the reset trigger signal CPURSTB is passed through OR gate circuits 6, 8 and AND gate circuit 10, and output as a reset output signal RSTB.

10 Claims, 12 Drawing Sheets

RESET CIRCUIT AND DIGITAL COMMUNICATION APPARATUS

CROSS-REFERENCE TO RELATED APPLICATIONS

This application is a continuation of International Application No. PCT/JP2004/005859, filed on Apr. 23, 2004, and claims priority to Japanese Patent Application No. 2003-121721, filed on Apr. 25, 2003, both of which are incorporated herein by reference in their entireties.

TECHNICAL FIELD

This invention relates to a reset circuit, supplied with a reset trigger signal, output from a general-purpose input/output port (PIO port) of e.g., a processor, to output a reset signal to a peripheral circuit, including e.g., a processor of a package.

BACKGROUND OF THE INVENTION

In a digital communication apparatus, having a rack structure, such as a wireless base station apparatus or an exchanger, a status monitor unit is provided to each package, and an upper order status monitor unit monitors the package states at all times through this status monitor unit. For example, in the digital communication apparatus, shown in FIG. 5, there are provided a plurality of packages 128 and an upper order monitor unit 27, which upper order monitor unit monitors the status of the packages 128. Each of the packages 128 includes a status monitor unit 20, a power supply monitor circuit 21, a processor 22, a power-on reset circuit 23, a clock monitor circuit 24, a reset circuit 101, an AND gate circuit 26, other devices 25 and an external pull-up resistor 29.

The status monitor unit 20 reports the state of the package 128 to the upper order monitor unit 27. The power supply monitor circuit 21 monitors the power supply voltage of the package 128 and sets the external power-on reset signal PRSTB to a high level, abbreviated to 'H' hereinbelow, when the power supply voltage is not lower than a prescribed value, while setting the external power-on reset signal PRSTB to a low level, 'abbreviated to 'L' hereinbelow, when the power supply voltage is lower than the prescribed value.

The processor 22 is such a device performing the processing in accordance with a pre-stored program, such as a CPU or a DSP (digital signal processor), and exercises control for various devices provided within the package 128. When the processor 22 has determined that the package 128 in its entirety needs to be reset (initialized), such as when the operation of the package 128 has become unstable such that re-setting (re-initializing) the package is necessary, the processor outputs a reset trigger signal CPURSTB from the PIO port to the reset circuit 101. In the explanation to follow, the reset trigger signal CPURSTB is an active low signal, so that, in resetting the package 128, the processor 22 performs the operation of setting the reset trigger signal CPURSTB, which is normally in a negated state indicating 'H' state, to an asserted state indicating 'L' state.

In general, when a signal line is in an effective or active state, such signal line is said to be asserted. When a signal line is in an ineffective or inactive state, such signal line is said to be negated. On the other hand, setting the signal line to the effective state or to the ineffective state is said to assert or negate the signal line, respectively.

The power-on reset circuit 23 generates an active low reset signal, based on the external power-on reset signal PRSTB from the power supply monitor circuit 21, to send the so generated signal to the AND gate circuit 26.

The clock monitor circuit 24 monitors clock signals, supplied to respective circuits in the package 128, and outputs, to the reset circuit 101, a clock stop detection signal CALMB, which is in the negated state indicating the 'H' state when the clock signals are operating normally, and which is in the asserted stat indicating the 'L' state when the clock signals are stopped.

The reset circuit 101 generates and outputs a reset output signal RSTB which takes on the level 'L' for a prescribed period when the reset trigger signal CPURSTB from the processor 22 takes on the level 'L'.

The AND gate circuit 26 takes a logical product of the reset signal from the power-on reset circuit 23 and the reset output signal RSTB from the reset circuit 101 to send the results of the processing operation to the status monitor unit 20, the processor 22, and to the other devices 25. Since the reset signal from the power-on reset circuit 23 and the reset output signal RSTB from the reset circuit 101 are both active low signals, the output of the AND gate circuit 26 also transitions to 'L' indicative of an active state if any one of the signals is active.

In this digital communication system, the upper order state monitor unit 27 monitors the state of each package 128 through the status monitor unit 20 provided to each of the plural packages 128.

FIG. 6 shows the configuration of the reset circuit 101 shown in FIG. 5. Referring to FIG. 6, this conventional reset circuit 101 is made up by inverter circuits 7, 9, a reset extension circuit 3 and an AND gate circuit 10.

The inverter circuit 7 inverts the reset trigger signal CPURSTB from the processor 22 to output the resulting inverted signal to an input terminal IN of the reset extension circuit 3.

The reset extension circuit 3 detects a rise edge of an output of the inverter circuit 7 and generates a signal which remains 'H' for a predetermined time as from the rise edge to send out the so generated signal at its output terminal OUT. The reset extension circuit 3 is supplied with a clock stop detection signal CALMB, as an asynchronous clear signal C and, when the clock is in a stopped state and the clock stop detection signal CALMB transitions to 'L' indicating the asserted state, the reset extension circuit is initialized to set the output terminal OUT to 'L'.

The inverter circuit 9 outputs to the AND gate circuit 10 a signal RSTB3 which is an inverted version of the output signal of the reset extension circuit 3.

The AND gate circuit 10 takes a logical product of the signal RSTB3 from the inverter circuit 9 and a signal RSTB4 of the same logic as the signal CPURSTB to send out the result of the operation as reset output signal RSTB.

FIG. 7 shows the configuration of the reset extension circuit 3 shown in FIG. 6. The reset extension circuit 3 is supplied with an input signal IN (active high signal), an external input clock CLK and an asynchronous clear signal C, as inputs, to output a reset extension signal OUT (active high signal). The asynchronous clear signal C is an active high signal for the reset extension circuit 3, such that, when the asynchronous clear signal C is H, the reset extension circuit performs the reset extending operation, whereas, when the asynchronous clear signal C is 'L', the reset extension circuit is initialized to set the output terminal OUT to 'L'.

The reset extension circuit 3 is made up by a differentiating circuit 31, a counter circuit 32 and a JK flip-flop circuit 33.

The differentiating circuit 31 is supplied with the input signal IN, external input clock CLK and with the asynchronous clear signal C to detect the rise edge of the input signal IN to send out a pulse of one clock width, synchronized with the external input clock CLK, to the counter circuit 32 and to the JK flip-flop circuit 33.

The differentiating circuit 31 is made up by a D-flip-flop circuit 311, a D-flip-flop circuit 312, an inverter circuit 313 and an AND gate circuit 314.

The D-flip-flop circuit 311 is supplied with the input signal IN as a D input, with the external input clock CLK as input clock and with an asynchronous clear signal C as an asynchronous clear input (active high), to send out an output Q to the inverter circuit 313 and to the AND gate circuit 314. The inverter circuit 313 is supplied with the output of the D-flip-flop circuit 311 as an input and sends out its inverted version to the D-flip-flop circuit 312. This D-flip-flop circuit 312 is supplied with the output of the inverter circuit 313 at a D input, with the clock CLK as input clock and with the external input C as the asynchronous clear signal C (active high) to send out an output Q to the AND gate circuit 314. The AND gate circuit 314 is supplied with outputs of the D-flip-flop circuits 311, 312 as inputs to perform logical product processing thereon to send out the result of the operation as output of the differentiating circuit 31.

The counter circuit 32 is supplied with the output of the differentiating circuit 31 at an LD input, with the clock CLK as an external input clock and with an external input C as the asynchronous clear signal (active high signal), to send out an output OUT to the K input of the JK flip-flop circuit 33. When the asynchronous clear signal C is 'H', the counter circuit 32 initializes the counter function to output 'L' to the terminal OUT. When the asynchronous clear signal C is 'L', and the input at LD is 'H', an initial value is set in the counter with the rise of the external input clock CLK. When the LD input transitions to 'L', the counter counts up or down with each rise of the external input clock CLK. When the counter has reached a setting value, a signal 'H' is output with the rise of the clock CLK.

The JK flip-flop circuit 33 is supplied with an output of the differentiating circuit 31 at the J-input, with an output OUT of the counter circuit 32 at the K-input, with the clock CLK at an input clock terminal, and with an asynchronous clear signal C (active high signal) at an external clear input C, to send out a Q output at an output terminal OUT of the reset extension circuit 3.

The signal flow in the reset extension circuit 3 is such that transition from 'L' to 'H' of the external input IN is detected by the differentiating circuit 31 to output a pulse 'H', and the JK flip-flop circuit 33 outputs the output signal OUT in the 'H' state, based on the pulse 'H', at the same time as an initial value is set in the counter circuit 32. When the prescribed period of time as provided in the counter circuit 32 has elapsed, the counter circuit 32 outputs a signal 'H', as a result of which the output signal OUT of the JK flip-flop circuit 33 is set to 'L'. Thus, the operation of the reset extension circuit 3 is such that 'H' is output as a signal OUT until a predetermined time has elapsed as from the rise edge of the input IN.

This operation of the reset extension circuit 3 will be explained by referring to the timing chart of FIG. 8.

When the reset trigger signal CPURSTB is asserted at timing of T0, the D-flip-flop circuit 311 of the differentiating circuit 31 outputs 'H' at FFOUT1 at a timing of T1 corresponding to the rise of the next clock. Since the output FFOUT2 of the D-flip-flop circuit 312 remains in the 'H' state at this time point, 'H' commences to be output in an output CIN of the differentiating circuit 31. At a timing of T2, FFOUT2 takes on the level 'L', so that CIN also transitions to 'L'. Since the J-input of the JK flip-flop circuit 33 is 'H' at this timing of T2, the Q-output of the JK flip-flop circuit 33 takes on the level 'H', while RSTB1 and the reset output signal RSTB become 'L' as from timing of T2, thus asserting the reset output signal RSTB. With the reset output signal RSTB thus asserted, the PIO port output of the processor 22 is initialized as input port and hence undergoes transition gradually to 'H' by the external pull-up resistor 29.

The shaded parts of the reset trigger signal CPURSTB in FIG. 8 indicates that the time for transition to 'H' differs with the constants of the pull-up resistor 29 or with the values of device capacitances. Hence, FFOUT1 and FFOUT2 may take 'H' or 'L' during the time as indicated by shaded parts. However, this has nothing to do with the operation as the reset extension circuit 3, since the output CIN of the differentiating circuit 31 necessarily outputs 'H' only during the time as from timing of T1 until timing of T2.

Since CIN is 'L' at the timing of T3, the counter circuit 32 starts counting up or down. At timing of T4, the predetermined time Td as set by the counter circuit 32 as from the timing of T3 has elapsed. At this timing of T4, the counter circuit 32 provided in the reset extension circuit 3 has timed out to output 'H' at the output terminal OUT. Thus, at a timing of T5, the output Q of the JK flip-flop circuit 33, provided in the reset extension circuit 3, takes on the level 'L', while the reset output signal RSTB takes on the level 'H', thus stopping reset extension.

If the reset trigger signal CPURSTB from the processor 22 is entered to the above-described conventional reset circuit 101, the reset output signal RSTB, which is set to the asserted state ('L' state) only for a predetermined time by the reset extension circuit 3 provided in its inside, is generated and output. The reason is that, in order for e.g., the other devices 25 to perform the normal reset operations, there is provided a minimum prescribed time period in which the reset output signal RSTB is to remain in the 'L' state, and that, for assuring the normal reset operations, the reset output signal RSTB must be in the 'L' state for a time duration not shorter than this prescribed time period.

Since the status monitor unit 20 reports the status of the package 128 to the upper order state monitor unit 27, it is necessary for the status monitor unit to be in operation even when the package 128 is malfunctioning, in order to continue the monitoring of the status of the package 128. Such malfunctioning state includes states in which clocks have ceased to be supplied to the processor 22 or to the reset circuit 101. Thus, in case the clocks are stopped during the time the reset circuit 101 is performing the operation for reset extension, the clock stop detection signal CALMB takes on the level 'L' to initialize the reset extension circuit 3 to set the output terminal OUT to 'L' to stop the reset extension of the reset circuit 101.

However, if the reset extension circuit 3 is reset by the clock supply cessation, such that the reset operation cannot be carried out, it becomes impossible for the processor 22 to carry out the reset operations.

Thus, with the conventional reset circuit 101, the reset trigger signal CPURSTB and the output of the inverter circuit 9 are entered to the AND gate circuit 10, and the output of the AND gate circuit 10 is output as the reset output signal RSTB, such that the reset output signal RSTB is directly output by way of a 'through outputting'.

By this configuration, the reset trigger signal CPURSTB may be directly sent as a 'through output' and output as the reset output signal RSTB. However, if the reset trigger signal CPURSTB is sent as 'through output' in this manner, the problem as now explained may be produced when the clock inputting is taking place normally.

In general, the PIO port acts as an input port during the resetting of e.g., a processor, and hence is in a high impedance state. Thus, a pull-up resistor or a pull-down resistor is connected in circuit for prescribing the level of negation of the reset trigger signal if, in case the PIO port is set as an output port and used for outputting the reset trigger signal, the processor is being reset. In the conventional technique, shown in FIG. 5, 'H' is the level of negation, and hence a pull-up resistor 29 is connected to the reset trigger signal CPURSTB.

If reset is entered to the processor 22 itself the instant the processor 22 has asserted the reset trigger signal CPURSTB, such that the processor 22 has discontinued to assert the reset trigger signal CPURSTB, the reset trigger signal CPURSTB undergoes transitions to the negated state over some time through the pull-up resistor 29.

However, with the reset extension circuit 3, shown in FIG. 7, the D-flip-flops 311, 312, counter circuit 32 and the JK flip-flop circuit 33 are provided for the input signal IN, so that, if the reset extension is to be carried out normally, it is necessary to adjust the constant of the pull-up resistor 29 in such a manner that the reset trigger signal CPURSTB will be in the 'L' state for at least two clocks or for a longer time as from the time the reset signal is entered to the processor 22.

FIG. 9 shows a timing chart in case reset extension has been carried out normally by adjusting the pull-up resistor 29. In FIG. 9, the reset trigger signal RSTB is kept in the 'L' state at timings T1, T2 when two clocks have as yet not elapsed as from a timing of T0 when the reset trigger signal RSTB has become 'L'. Consequently, the reset output signal RSTB follows a scheduled operation of transition in which the signal takes on the level 'L' at the timing of T0 and subsequently takes on the level 'H' after lapse of the predetermined time.

However, if the constant of the pull-up resistor 29 or the value of the device capacitance is too low, it may be an occurrence that the time of two clocks is not guaranteed as the time duration in which the reset trigger signal CPURSTB remains in the 'L' state. FIGS. 10 and 11 depict the timing charts for such case.

FIG. 10 shows a case wherein the reset trigger signal CPURSTB transitions to 'L' and then reverts to 'H' before detection of the next rise edge of the clock signal, with the result that the reset extension circuit 3 is unable to detect the reset trigger signal CPURSTB such that it is unable to perform reset extension. FIG. 11 shows a case wherein the time of two clocks is not guaranteed as the time duration during which the reset trigger signal CPURSTB is 'L', with the result that the reset output is transiently negated.

In FIG. 10, the reset trigger signal CPURSTB at timing of T0 transitions to 'L' indicating the asserted state and reverts at timing of T1 to a level at which the signal is determined to be 'H'. Thus, even though the AND gate circuit 10 detects that the reset trigger signal CPURSTB has transitioned to 'L', such that the reset output signal RSTB keeps on to be 'L' as from timing of T0 until timing of T1, the reset extension circuit 3 is unable to detect that the reset trigger signal CPURSTB has transitioned to 'L', such that no reset extension is carried out. The result is that the reset trigger signal CPURSTB is negated at the timing of T1 and hence the time during which the reset output signal RSTB keeps onto be in the 'L' state becomes shorter such that the reset time prescribed by the devices cannot be achieved.

FIG. 11 shows a case wherein the signal level of the reset trigger signal CPURSTB sufficient to verify the signal to be in the 'L' state can be maintained only until lapse of one clock as from the time the signal CPURSTB has transitioned to 'L'. In FIG. 11, the reset trigger signal CPURSTB at timing of T0 takes on the level 'L' indicating the asserted state and maintains the 'L' level at timing of T1. However, the reset trigger signal is unable to maintain the 'L' level at timing of T3. Hence, the reset extension cannot be achieved normally and, at timing of T2 when the reset trigger signal CPURSTB has been determined to be 'H', the reset output signal RSTB transiently takes on the level 'H' indicating the negated state and again takes on the level 'L' at timing of T3.

In any of the above-described cases of FIGS. 10 and 11, it is not assured that the reset output signal RSTB takes on the level 'H', indicating the asserted state, for a prescribed time duration, with the result that malfunction is produced, depending on device types. It may be an occurrence that a package performs unpredictable operations. Thus, with the conventional reset circuit 101, the state of 'L' of the reset trigger signal CPURSTB is guaranteed, by adjusting the constant of the pull-up resistor or the pull-down resistor, until such time that two clocks have elapsed as from the transitioning of the reset trigger signal CPURSTB to 'L', lest the above-described problem should be produced.

When the clocks are stopped at the time the power supply is turned on, the conventional reset circuit 101 suffers from a problem different from the above-described problem. If clocks are present on power up, data values or input/output settings of input/output ports of e.g., processors do not become indefinite even if the clocks are subsequently stopped, such that the reset output signal RSTB is not fixed at 'L' even if the reset trigger signal CPURSTB is output as 'through-signal' for operating as the reset output signal RSTB. However, when the clocks are stopped on power up due e.g., to malfunctions, the PIO port and neighboring circuitry of the processor 22 cannot be reliably initialized and becomes destabilized. Consequently, the PIO port, which should inherently be set to high impedance during reset, is likely to take on an output mode to become fixed in the state of asserting the reset trigger signal CPURSTB to the reset circuit 101, that is, in the 'L' state. FIG. 12 shows a timing chart for such case.

In FIG. 12, the power supply is turned on as the clock stop detection signal CALMB is 'L', that is, with the clock signals in the stopped state, and the reset trigger signal CPURSTB is fixed at 'L'. With the conventional reset circuit 101, shown in FIG. 6, the reset trigger signal CPURSTB is directly supplied in such state to the AND gate circuit 10, so that the reset output signal RSTB is also fixed at 'L', that is, in the asserted state. Consequently, the reset signal, supplied to the status monitor unit 20, keeps on to be asserted, and hence the status monitor unit is unable to report the stop of the clock signals to the upper order state monitor unit 27.

Heretofore, a large variety of circuit configurations have been proposed as a reset circuit for generating reset signals. For example, there has been proposed a reset circuit for preventing malfunctions by shifting the supply timing of the reset signal to various circuits architecting the system (for example, see JP Patent Kokai Publication JP-P2001-142792A). However, there lacks up to now a reset circuit capable of solving the above problems.

The above-described conventional reset circuit suffers the following problems:

(1) Except if it is determined that the asserted state persists for not less than two clocks in the least as from the time the reset signal is entered to the processor, a normal reset extension operation cannot be achieved. Hence, it becomes necessary to adjust the constant of the pull-up resistor coupled to the reset trigger signal.

(2) If the power supply is turned on as the clock signals are stopped, such that the reset trigger signal keeps on to be asserted, the state monitor unit is also reset and hence is unable to report the stopped state of the clock signals to the upper order monitor unit.

It is an object of the present invention to provide a reset circuit in which, as the function of outputting the reset trigger signal in a 'through' fashion in case the clocks of the reset circuit are stopped, and the function of stopping the reset extension when the clocks are stopped during the reset extension, are left, the necessity for adjusting the constant of the pull-up resistor or the pull-down resistor of the reset trigger signal is eliminated to assure a reliable reset operation.

It is another object of the present invention to provide a reset circuit in which, even when clocks are stopped on power up such that the PIO port of e.g., a processor takes on the output mode, with the reset trigger signal becoming fixed in the asserted state, the reset may be canceled to enable the operation of the status monitor unit.

SUMMARY OF THE DISCLOSURE

For accomplishing the above object, the present invention provides a reset circuit supplied with a reset trigger signal output from a general-purpose input/ output port of a processor to generate a reset output signal to output the reset output signal to other circuits inclusive of the processor, in which the reset circuit comprises first mask means for masking the reset trigger signal, supplied thereto as an input, during the time which elapses after an external power-on reset signal indicating the current power supply state indicates power supply on until a clock stop detection signal indicating the operating state of clocks indicates for the first time that the clocks are operating normally, a reset extension circuit for detecting an edge of a reset trigger signal as entered from the first mask means when the reset trigger signal becomes asserted and for generating and outputting a signal which becomes asserted for a prescribed period of time as from the edge of the reset trigger signal, initializing means for initializing the reset extension circuit in case the external power-on reset signal indicates power supply off, or in case the clock stop detection signal indicates that the clocks are stopped, second mask means for masking the reset trigger signal from the first mask means in case the clock stop detection signal indicates that the clocks are operating normally, and reset output signal generating means for setting the reset output signal to an asserted state in case one of the signal from the reset extension circuit and the reset trigger signal from the second mask means is in an asserted state.

According to the present invention, if the clock stop detection signal indicates the normal operating state of the clocks, the reset trigger signal, output from the first mask means, are masked by the first mask means. Hence, during the normal operation, the reset output signal is set to the asserted state only in case the reset extension circuit has detected that the reset trigger signal has taken on the asserted state. Consequently, the reset signal can be reliably asserted for a prescribed period of time as such reset extension in which a reset signal is asserted and then negated transiently, if for a short time, so as to be subsequently asserted is prevented from occurrence. The result is that the reset trigger signal, entered from the PIO port of e.g., a processor, may reliably be detected to extend the reset signal irrespective of the constants of external pull-up or pull-down resistors or capacitance values of various devices. This prevents the package from entering into unpredictable operations due to short-time negation liable to be produced in conventional circuits.

Moreover, in case the clocks are stopped when the power supply has been turned on, the reset trigger signal can be masked by the first mask means. Thus, if e.g., the processor is unable to initialize the circuitry in the neighborhood of the PIO port due to the absence of the clocks on power up, such that input/output settings or output values become fixed in unstable states, it is possible to negate the reset output signal to allow for the operation of the status monitor unit for the packages.

Preferably, the first mask means includes an inverter circuit supplied with the clock stop detection signal to output a complemented signal of the clock stop detection signal, which clock stop detection signal is such a signal transitioning to a high level for indicating the normal operating states of the clocks and to a low level when the clocks are stopped, and a latch circuit supplied with the external power-on reset signal as a reset input and with an output of the inverter circuit at an input terminal. The latch circuit outputs a high level signal at an output terminal, without dependency upon the value of the signal input to the input terminal, when the external power-on reset signal is at a low level indicating the power supply off state, with the latch circuit continuing to output a low level signal at the output terminal if a low level signal is entered to the input terminal even once in case the reset input is at a high level. The first mask means also preferably includes an OR gate circuit supplied with the reset trigger signal which takes on a low level in an asserted state and with a signal output from the output terminal of the latch circuit to perform logical sum operations thereon to output the result thereof.

Also preferably, the second mask means is formed by logical sum operating means performing logical sum operations on an output of the OR gate circuit and the clock stop detection signal to output the results thereof to the reset output signal generating means.

Further preferably, the initializing means is formed by a NAND gate circuit 5 supplied with the external power-on reset signal and with the clock stop detection signal as inputs to perform the operations of finding a logical product thereof and inverting the logical product to send the result of the operations to an asynchronous clear input of the reset extension circuit.

DESCRIPTION OF THE PREFERRED EMBODIMENTS

Figure 1:
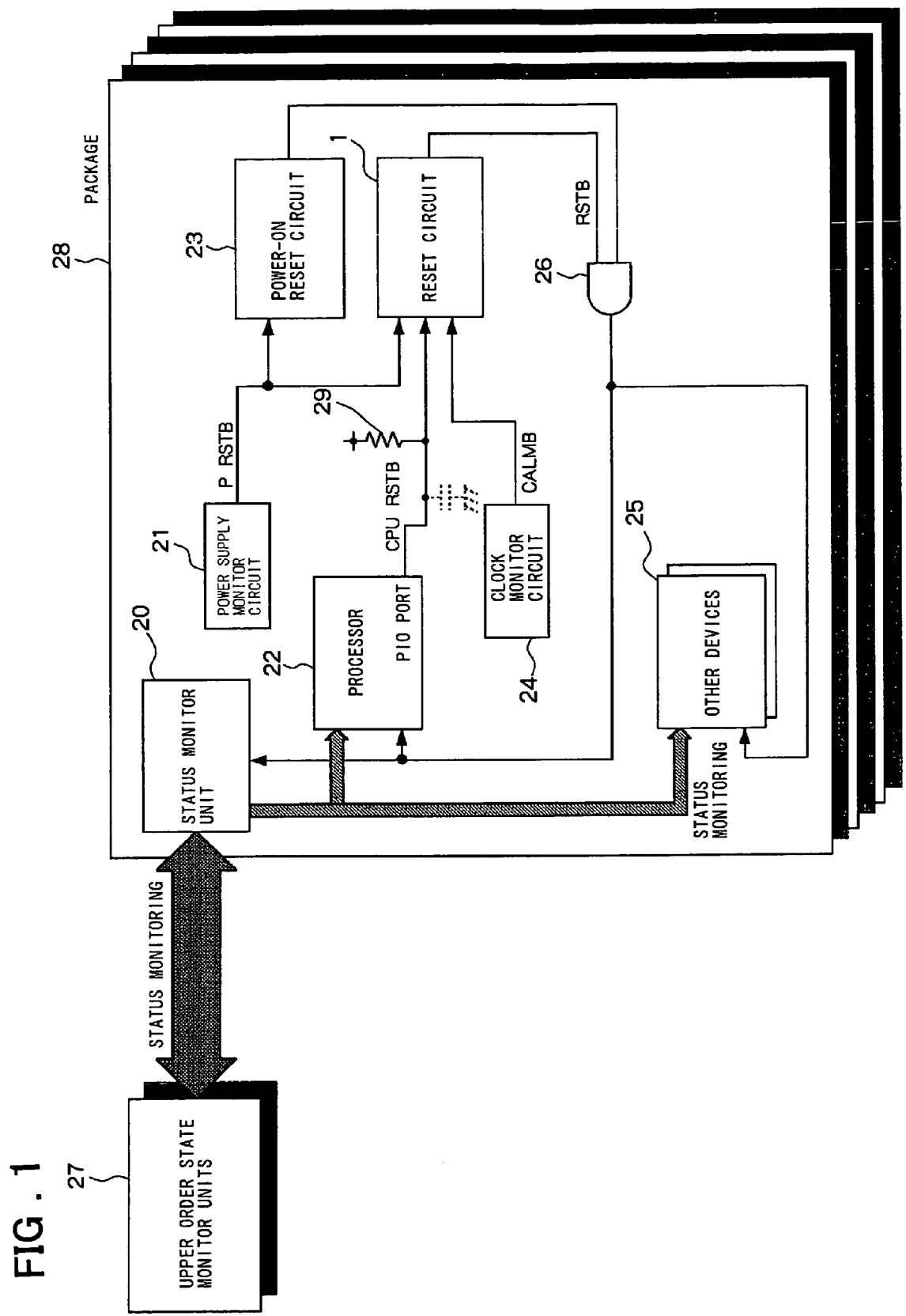
FIG. 1 is a block diagram showing the configuration of a digital communication apparatus provided with a reset circuit 1 according to an embodiment of the present invention.

Referring to the drawings, present embodiments of the present invention will be explained in detail.

FIG. 1 depicts a block diagram showing the configuration of a digital communication apparatus of the rack configuration including reset circuit according to an embodiment of the present invention. In FIG. 1, the parts or components, which are the same as those of FIG. 5, are denoted by the same reference symbols and the corresponding description is dispensed with.

The digital communication apparatus of the present embodiment includes a plural number of packages 28 and an upper order state monitor unit 27. Each of the packages 28 includes a status monitor unit 20, a power supply monitor circuit 21, a processor 22, a power-on reset circuit 23, a clock monitor circuit 24, a reset circuit 1, an AND gate circuit 26, other devices 25, and an external pull-up resistor 29.

Figure 5:
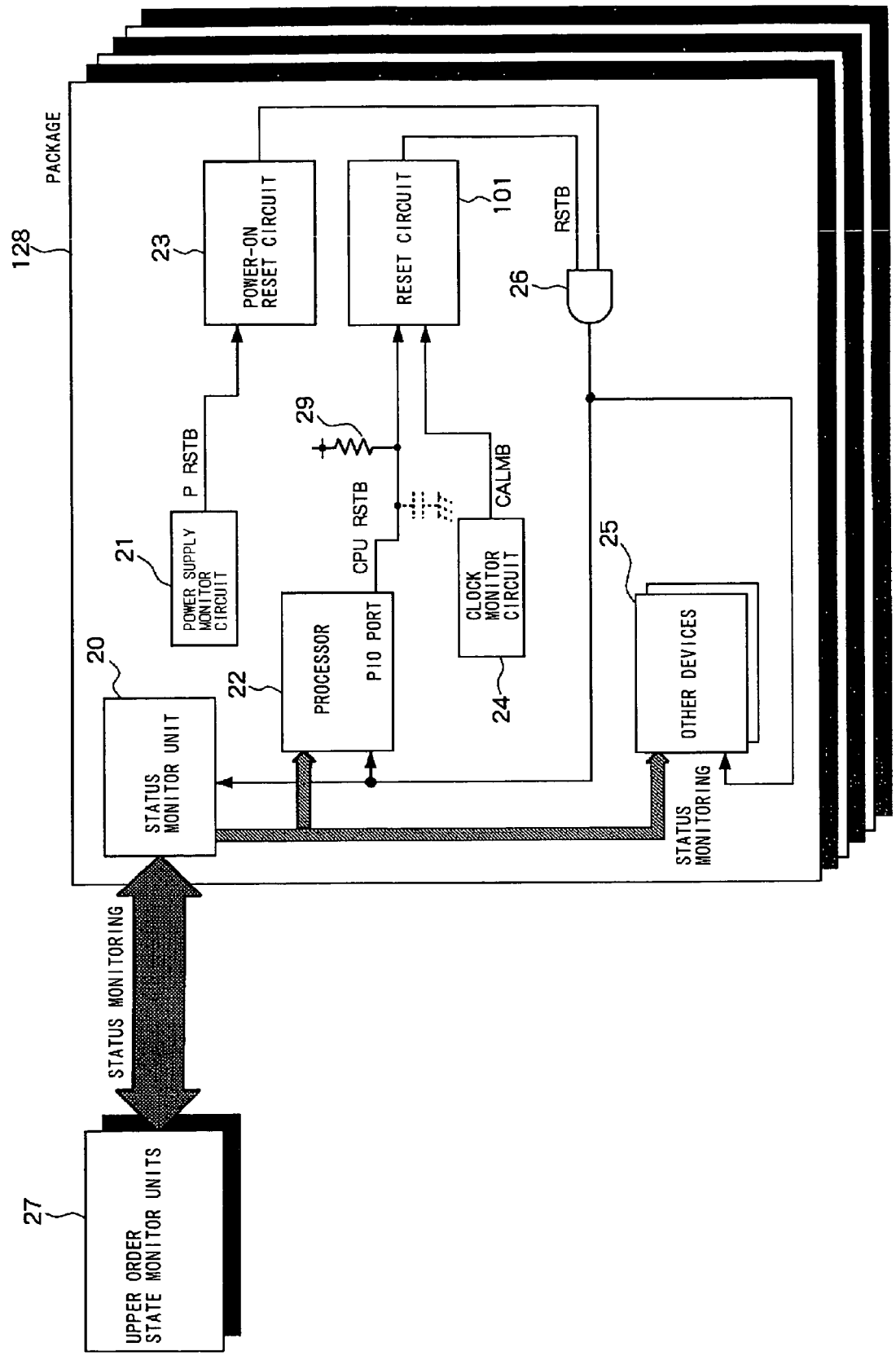
FIG. 5 is a block diagram showing the configuration of a digital communication apparatus provided with a conventional reset circuit 101.

The package 28 of the present embodiment differs from the package 128, shown in FIG. 5, in that the reset circuit 1 is substituted for the reset circuit 101, and in that, in addition to the reset trigger signal CPURSTB and the clock stop detection signal CALMB, an external power-on reset signal PRSTB is entered to the reset circuit 1.

The reset circuit 1 of the present embodiment has the following three functions. The first function is a function of checking for the possible presence of a falling edge of the reset trigger signal CPURSTB, entered from a PIO port during the normal operation, and reliably outputting, on detecting a falling edge, a reset output signal RSTB, the asserted state of which is guaranteed to be sustained for a predetermined period of time.

The second one is a through-outputting function of discontinuing reset extension by entering a clock stop detection signal CALMB of the active-low logic, supplied from the clock monitor circuit 24 on clock stop (clock supply discontinuation), and outputting the reset trigger signal CPURSTB itself as a reset output signal RSTB.

The third one is the function of masking the reset trigger signal CPURSTB itself if the external power-on reset signal PRSTB of the active low logic, supplied on power up, that is, from the power supply monitor circuit 21, takes on the 'L' state, and the clock stop detection signal CALMB is 'L', in order to avoid such a situation in which the reset output signal RSTB continues to be asserted due to use of the unstable state of the PIO port as reset trigger signal CPURSTB input.

By the above three functions, the status monitor unit 20 may be prevented from continuously falling into a reset state to prevent the upper order state monitor unit 27 from becoming unable to monitor the state of the package 28.

Figure 2:
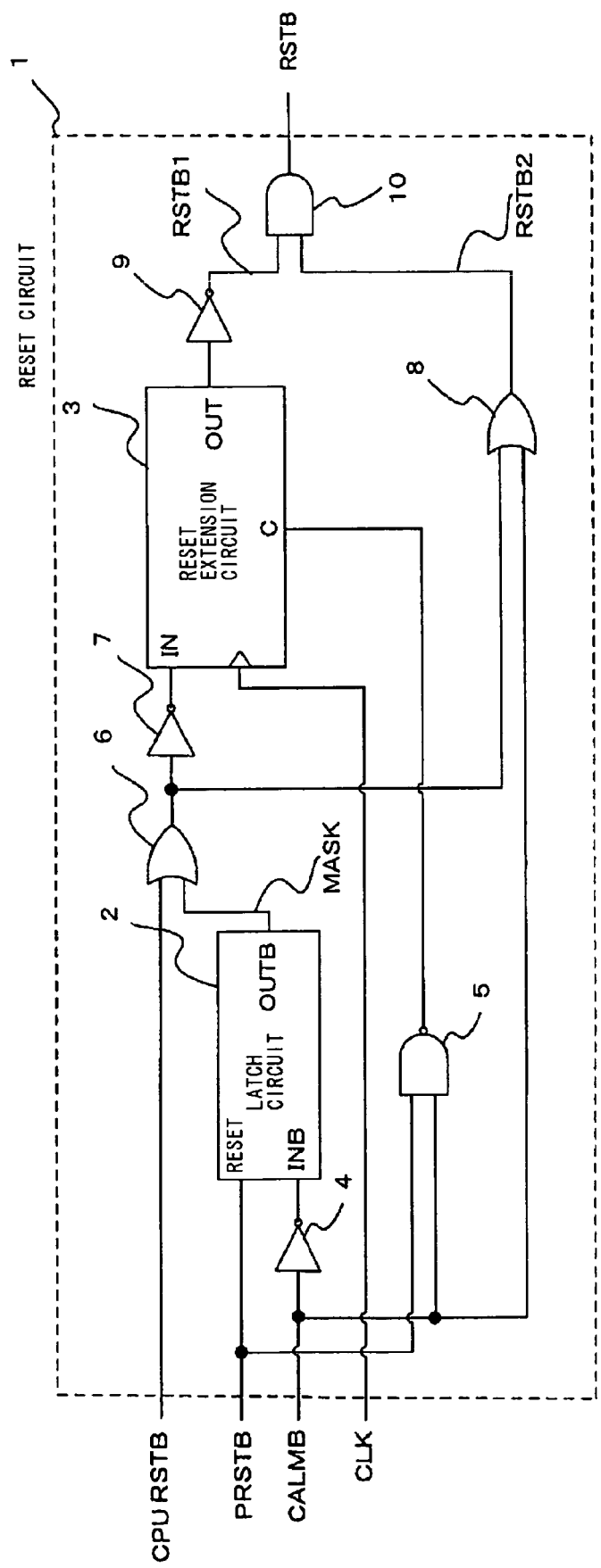
FIG. 2 is a circuit diagram showing the configuration of the reset circuit 1 shown in FIG. 1
Figure 6:
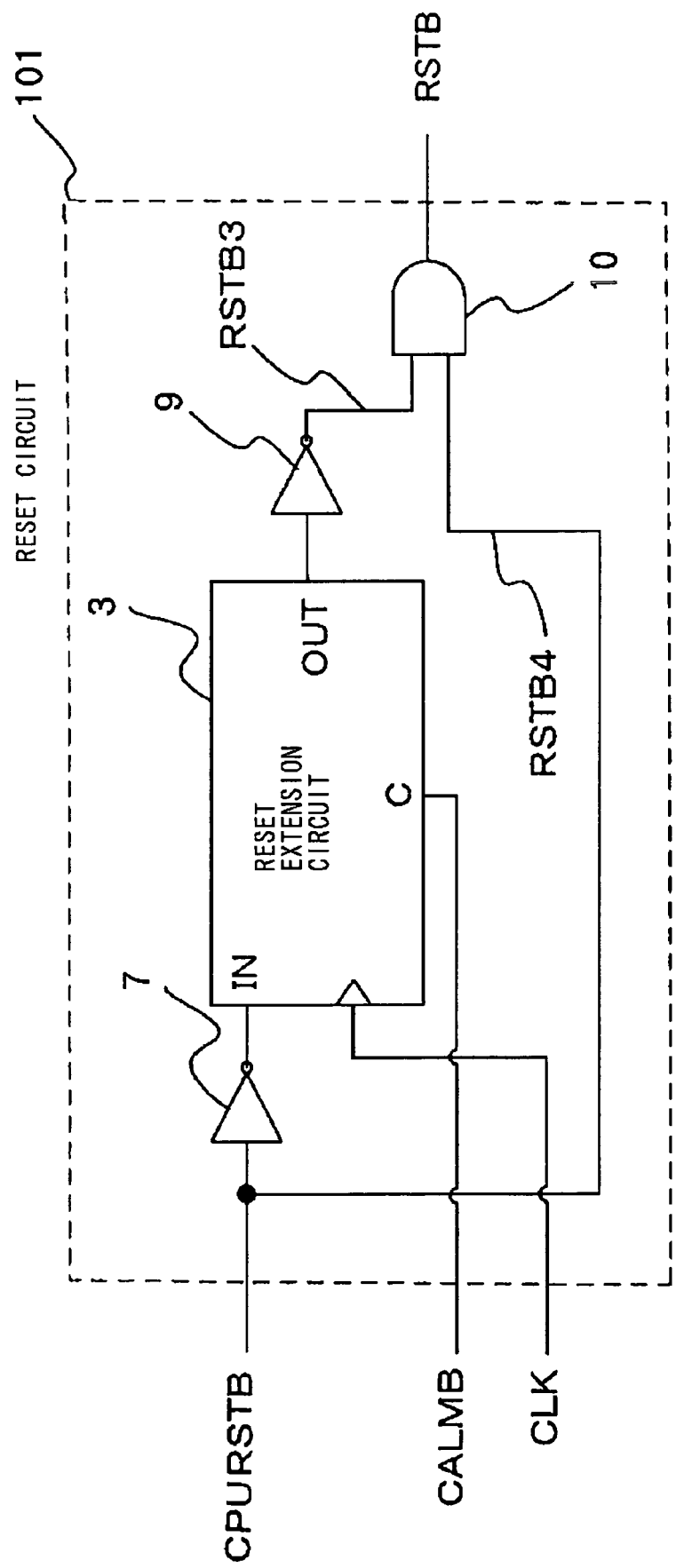
FIG. 6 is a circuit diagram showing the configuration of the reset circuit 101 shown in FIG. 5.
Figure 7:
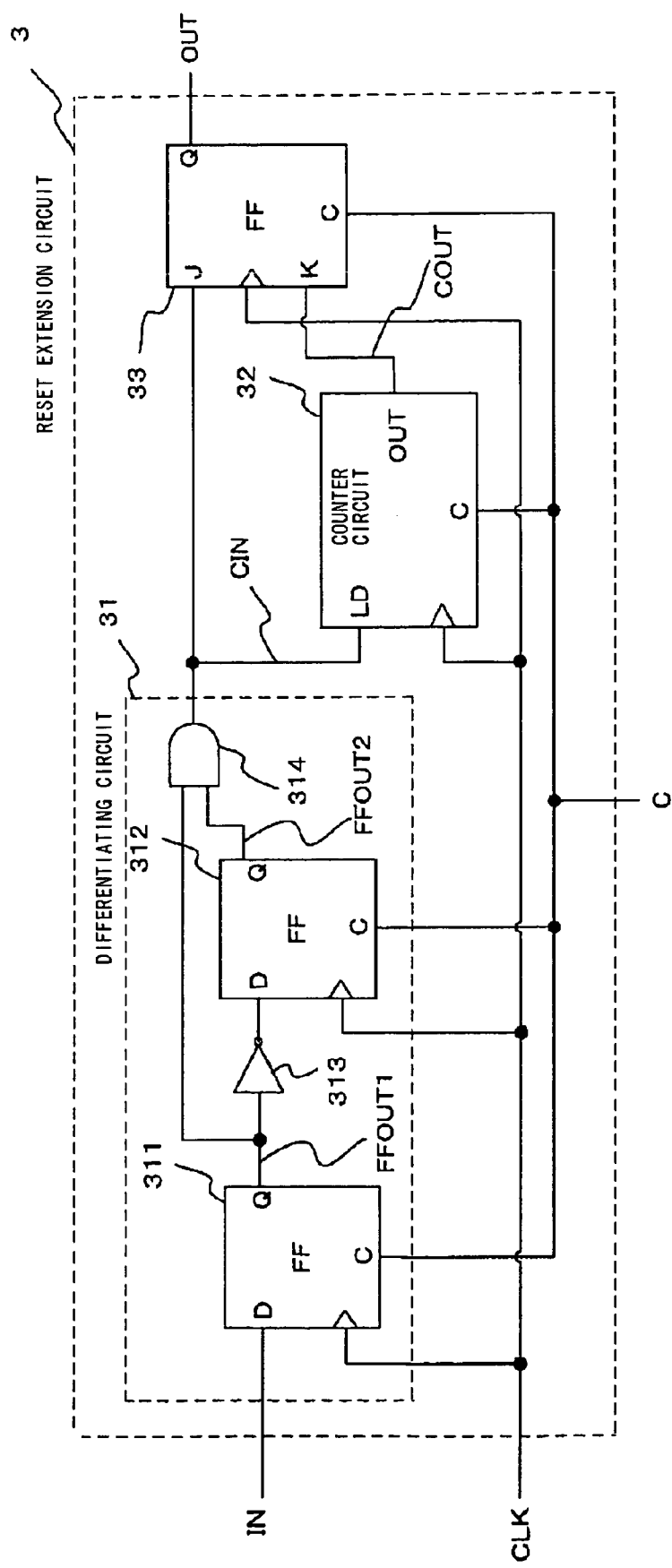
FIG. 7 is a circuit diagram showing the configuration of a reset extension circuit 3 shown in FIG. 6.
Figure 8:
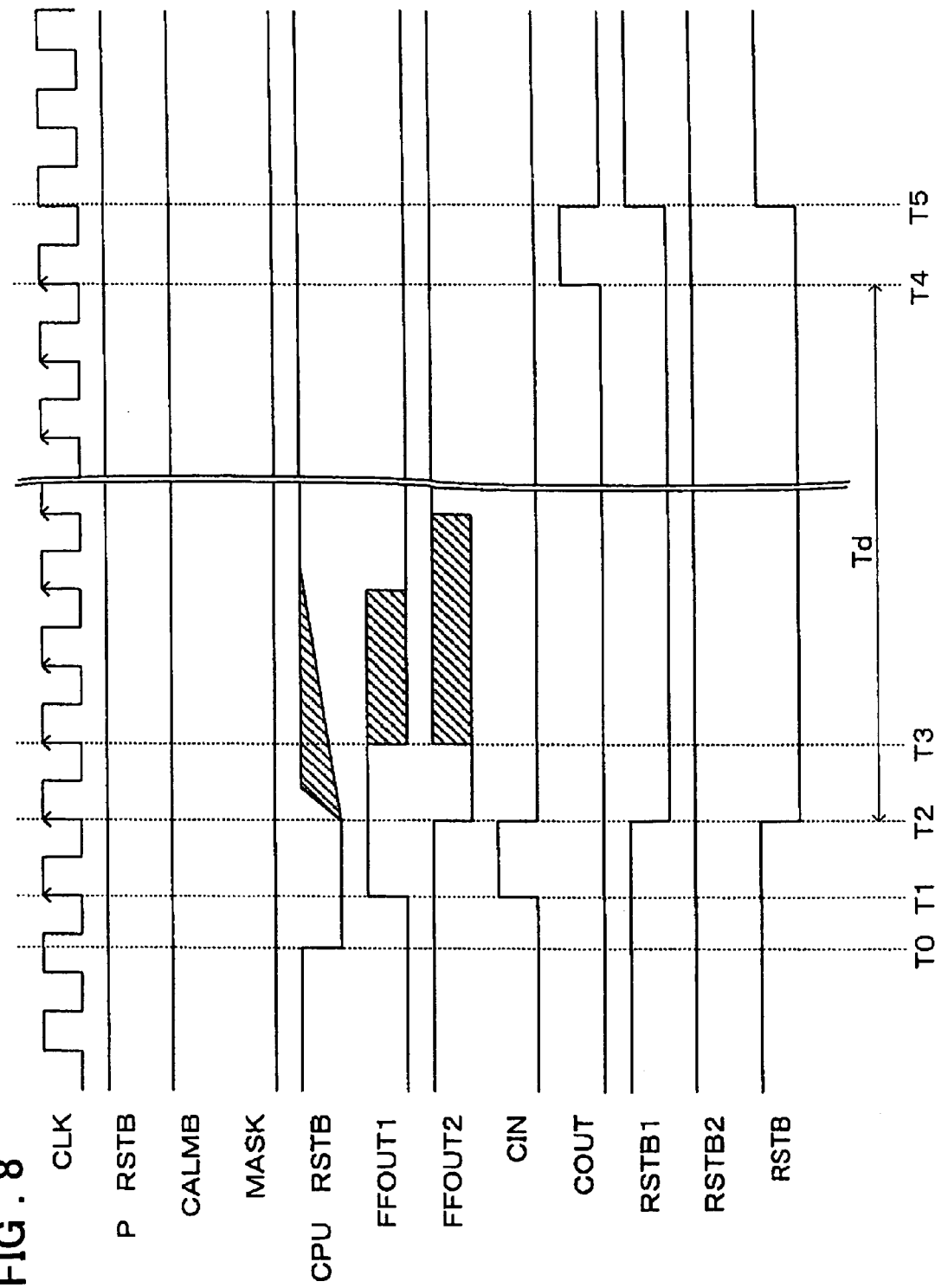
FIG. 8 is a timing chart showing the operation of the reset extension circuit 3.
Figure 9:
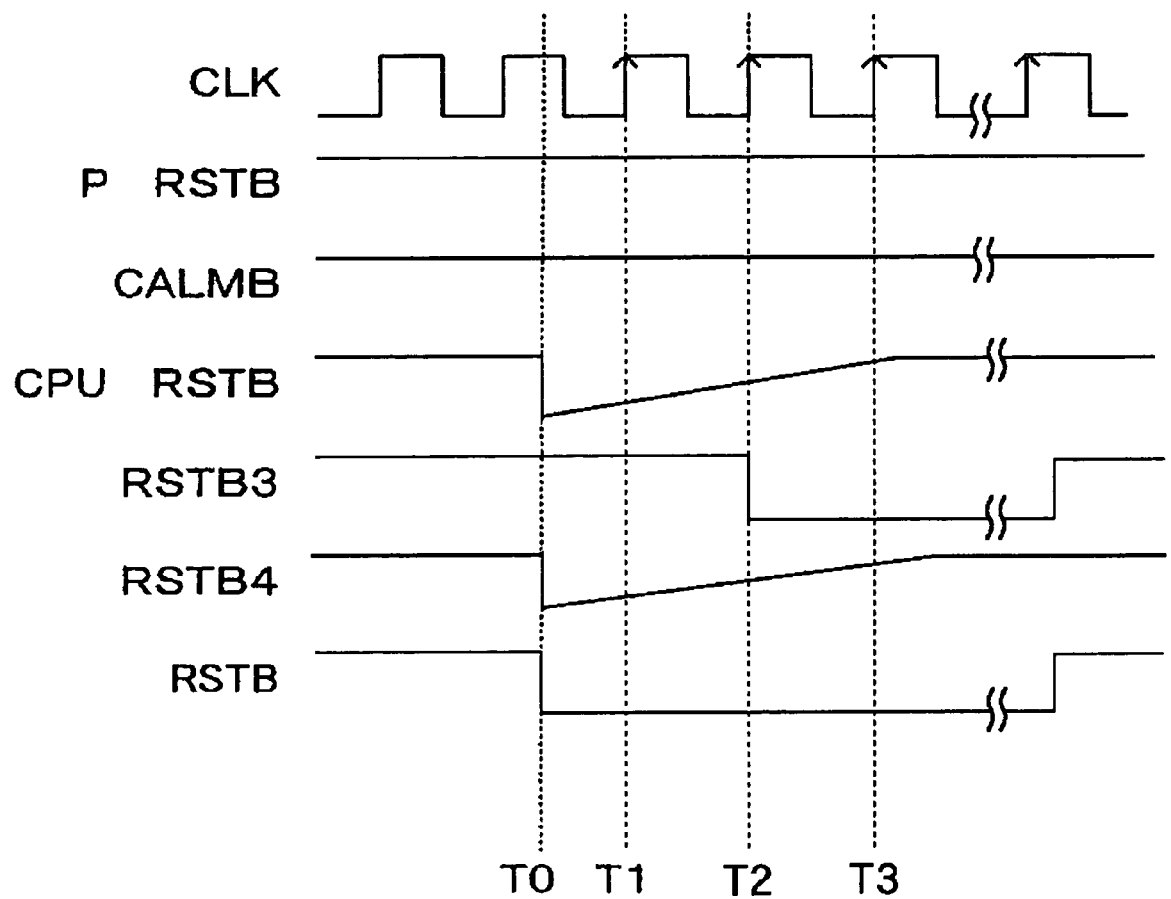
FIG. 9 is a timing chart showing the operation in case reset extension in the conventional reset circuit has been carried out normally.
Figure 10:
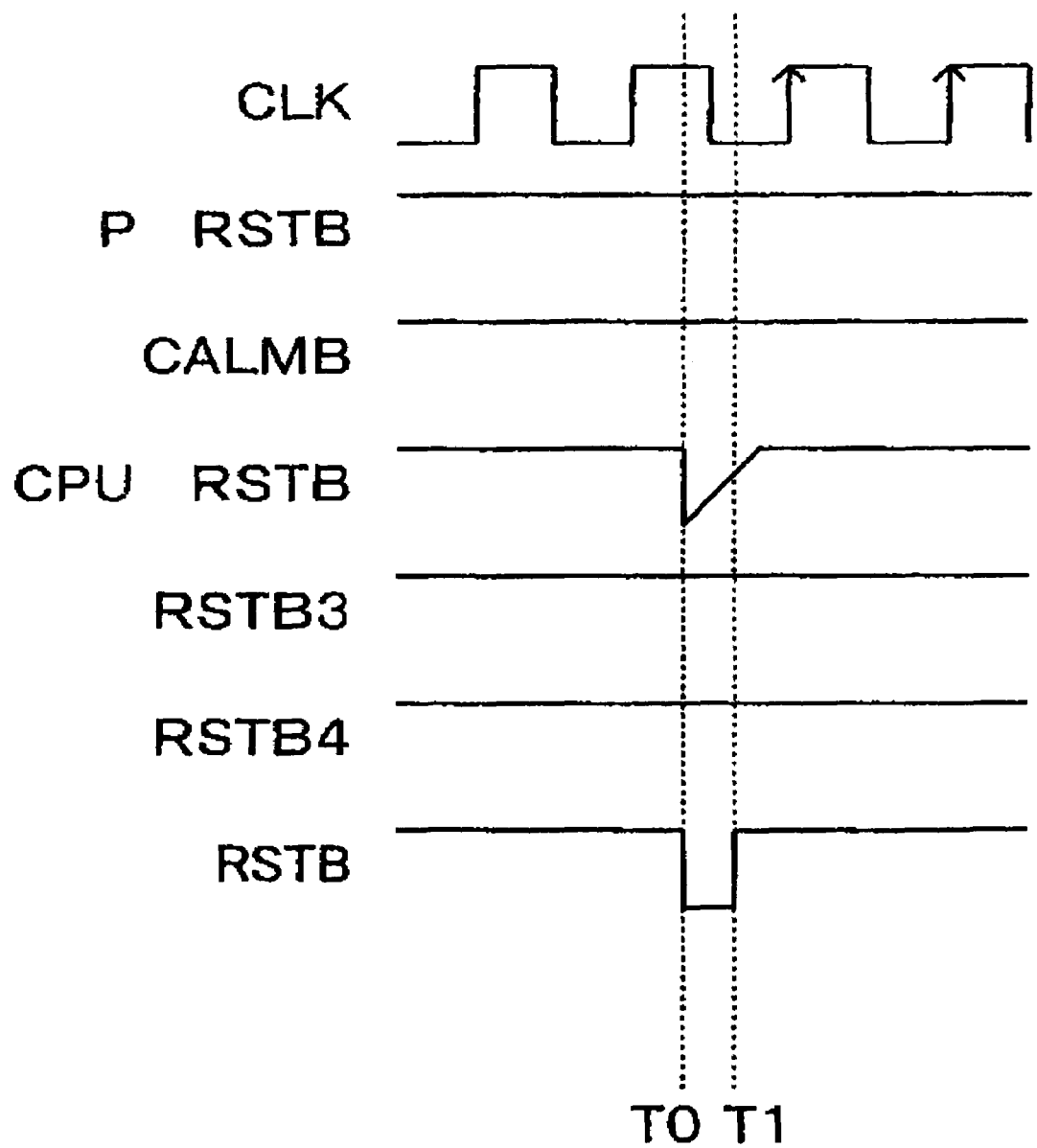
FIG. 10 is a timing chart showing the operation in case reset extension in the conventional reset circuit has not been carried out normally.
Figure 11:
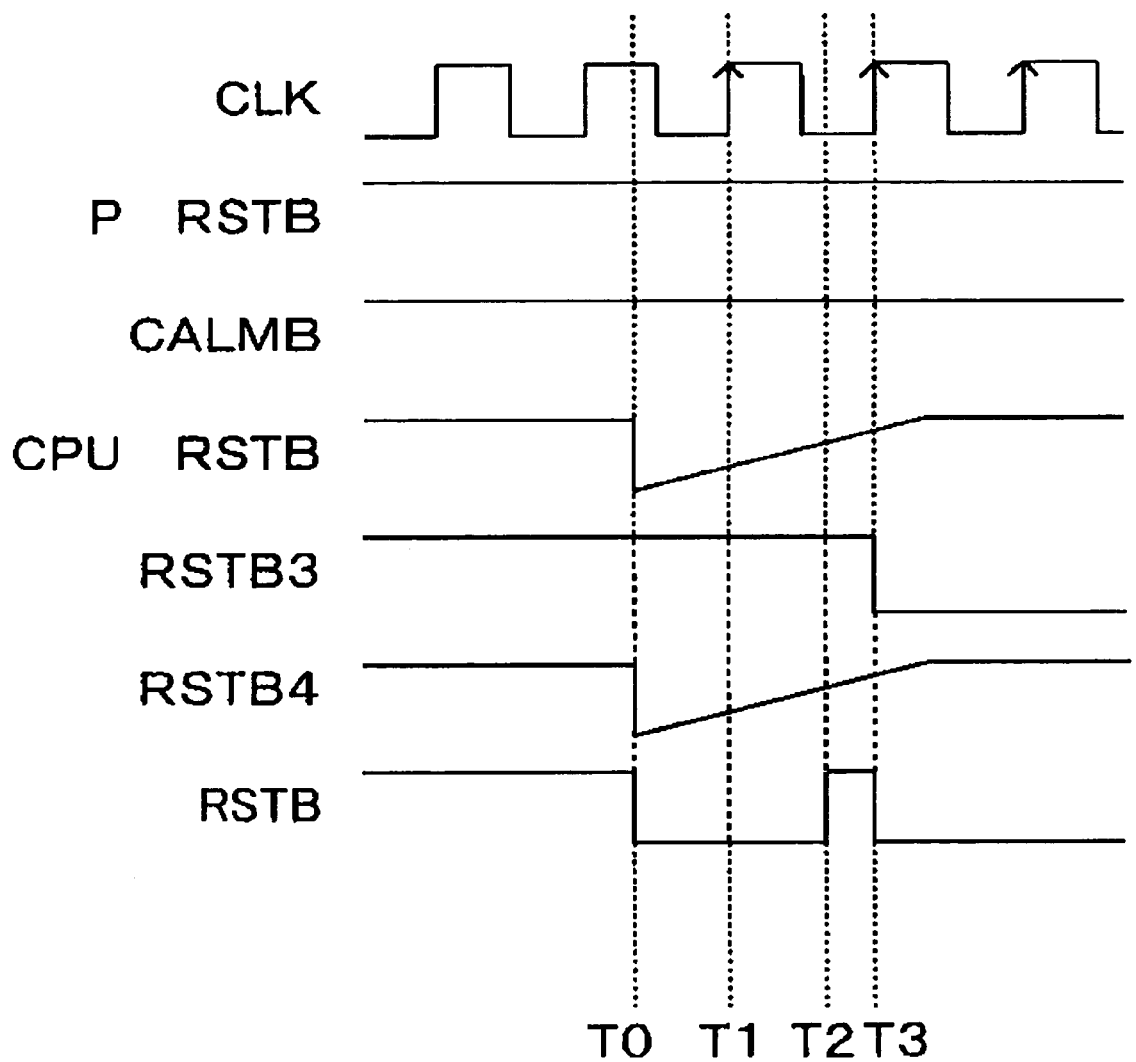
FIG. 11 is another timing chart showing the operation in case reset extension in the conventional reset circuit has not been carried out normally.
Figure 12:
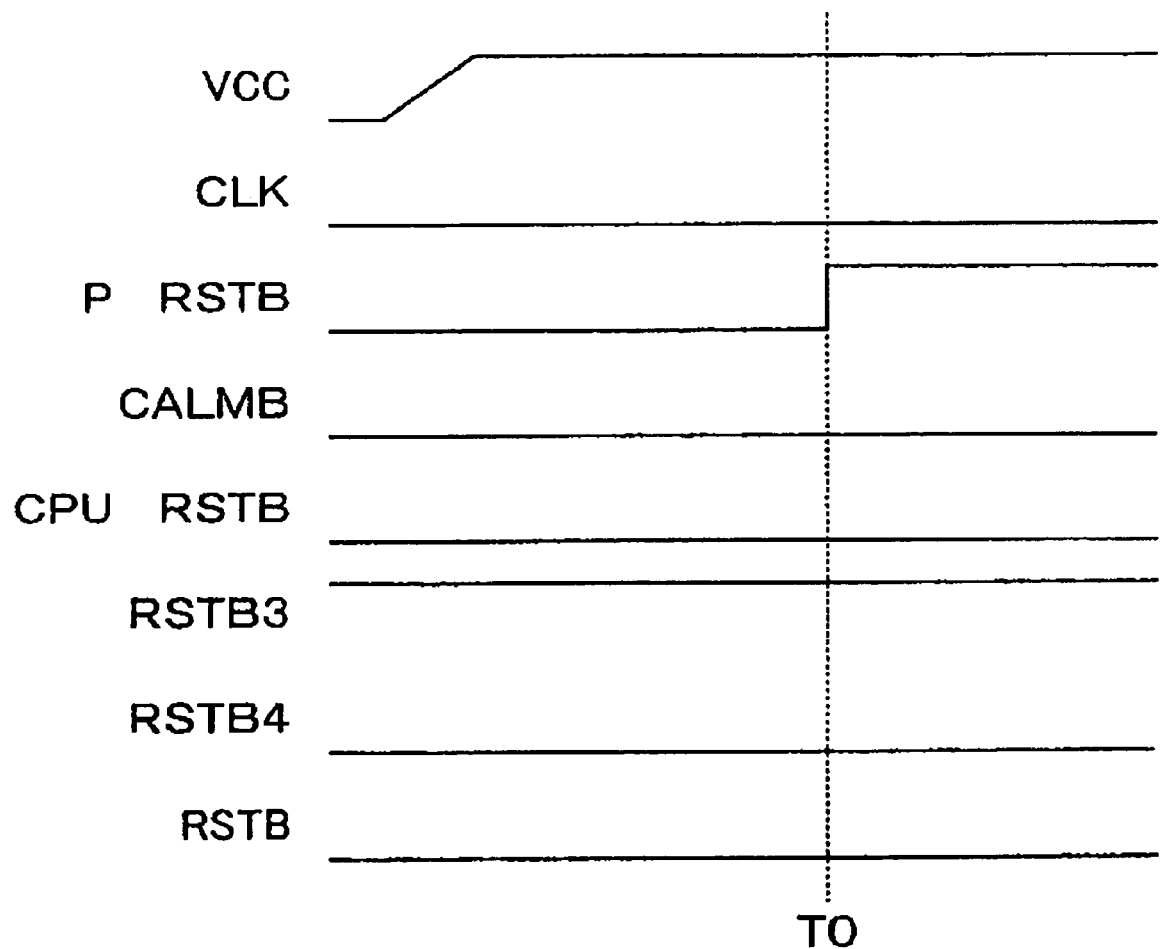
FIG. 12 is a timing chart showing the operation in case the power supply has been turned on as the clocks are in the stopped state in the conventional reset circuit.

The configuration of the reset circuit 1 of the present embodiment is shown in FIG. 2, in which the parts or components, which are the same as those shown in FIG. 6, are denoted by the same reference symbols and the corresponding explanation is dispensed with.

In the reset circuit 1 of the present embodiment, there are newly added a latch circuit 2, an inverter circuit 4, a NAND gate circuit 5 and OR gates 6, 8, to the conventional reset circuit 101 shown in FIG. 6.

The reset circuit 1 is supplied with a reset trigger signal CPURSTB, as a PIO port output of the processor 22, an external power-on reset signal PRSTB, a clock stop detection signal CALMB and with external clock signals CLK, to output a reset output signal RSTB.

An inverter circuit 4 is supplied with the clock stop detection signal CALMB as an input, and outputs an inverted version of the clock stop detection signal CALMB to an input INB of the latch circuit 2.

The latch circuit 2 receives the external power-on reset signal PRSTB as a reset input and sends an output of the inverter circuit 4 to the input terminal INB, while outputting a signal output from an output terminal OUTB to the OR gate 6. The operation of the latch circuit 2 is such that, when the reset input is 'L', a signal 'H' is forcibly output, by way of initialization, to the output terminal OUTB, without dependency upon the input value of the input terminal INB, whereas, when the reset input is H, 'L' keeps on to be output at the output terminal OUTB if 'L' is entered, if only once, to the input terminal INB.

The latch circuit 2, performing the above operation, is well-known to those skilled in the art, while being irrelevant to the present invention. Thus, the configuration of the latch circuit is not explained herein in detail.

The OR gate 6 is supplied with the reset trigger signal CPURSTB and with an output of the output terminal OUTB of the latch circuit 2 to carry out the logical sum operations thereon to send the result of the operations to the inverter circuit 7 and to the OR gate 8. By the operation of the OR gate circuit 6, the reset trigger signal CPURSTB is masked in case the output from the output terminal OUTB of the latch circuit 2 is 'H'.

That is, by the provision of the latch circuit 2, OR gate circuit 6 and the inverter circuit 4, 'H' is output to the output terminal OUTB as long as the external power-on reset signal PRSTB is asserted, such as to mask the reset trigger signal CPURSTB. Hence, the reset trigger signal CPURSTB is continuously masked as from power supply on until the clock stop detection signal CALMB is 'H' even once as from the time the external power-on reset signal PRSTB is negated, that is, until the presence of the clock is confirmed. After releasing the masking, the reset trigger signal CPURSTB is transmitted as a 'through' signal.

The inverter circuit 4, latch circuit 2 and the OR gate circuit 6 operate as a first masking means for masking the input reset trigger signal CPURSTB during the time as from the time when the power-on reset signal PRSTB indicating the current power supply state takes on the 'H' level, indicating the power supply on, until the clock stop detection signal CALMB indicating the clock operating state first takes on the 'H' level indicating the normal clock operation.

The NAND gate 5 carries out the operation of inverting the result of logical product of the external power-on reset signal PRSTB and the clock stop detection signal CALMB and sends the result of the operations of the processing to an asynchronous clear input C of the reset extension circuit 3. In case either the external power-on reset signal PRSTB or the clock stop detection signal CALMB is 'L', the NAND gate 5 outputs 'H' to initialize the operation of the reset extension circuit 3. That is, the NAND gate 5 operates as an initializing means for the reset extension circuit 3 in case the power supply voltage falls below a prescribed value or the clocks cease to be supplied.

The inverter circuit 7 is supplied with an output of the OR gate circuit 6 as an input and outputs a complemented signal thereof to the input IN of the reset extension circuit 3.

The reset extension circuit 3 is supplied with an output of the inverter circuit 7 as an input terminal IN, with an external input clock CLK at a clock terminal, and with an output of the NAND gate circuit 5 at an asynchronous clear input C (active high logic) as an asynchronous clear input, to send out an output OUT to an inverter circuit 9. On power up or during the time of clock stop (with the external power-on reset signal PRSTB being 'L' or with the clock stop detection signal CALMB being 'L'), the reset extension circuit 3 halts its reset extension to output 'L' to the output terminal OUT. With the external power-on reset signal PRSTB being 'H' and with the clock stop detection signal CALMB being 'H', that is, during the normal operation, 'H' is output to the output terminal OUT with the rise of the second clock for which the signal at the input terminal IN is changed from 'H' to 'L'. When a prescribed period of time as set in a counter circuit 32 provided in the reset extension circuit 3 has elapsed as from that time, 'L' is output to the output terminal OUT.

The inverter circuit 9 receives an output from the output terminal OUT of the reset extension circuit 3, as an input, and outputs a complemented signal thereof to the AND gate 10.

The OR gate circuit 8 performs a logical sum operation on an output from the OR gate circuit 6 and the clock stop detection signal CALMB to output the result of processing as RSTB2 to the AND gate circuit 10. The OR gate circuit 8 operates as a second mask means for masking a reset trigger signal from the OR gate circuit 6 when the clock stop detection signal CALMB is 'H' indicating that the clocks are stopped.

The AND gate circuit 10 is supplied with and performs logical sum processing on an output of the OR gate circuit 8 and an output of the inverter circuit 9 and outputs the result of the processing as a reset output signal RSTB of the reset circuit 1. The AND gate circuit 10 operates as a reset output signal generating means for setting the reset output signal RSTB to the asserted state when either the signal from the reset extension circuit 3 or the reset trigger signal from the OR gate circuit 8 is in the asserted state.

The operation of the reset circuit 1 of the instant embodiment during the normal operation, that when the clocks are stopped during the normal operation, and that when the clock supply has ceased at the time the power supply is turned on, will now be explained in detail with reference to the drawings.

(1) First, the operation during the normal operation will be explained.

During the normal operation when no abnormalities have occurred within the package 28, the external power-on reset signal PRSTB is H, whilst the clock stop detection signal CALMB is 'H'. That is, when the power-on reset is entered normally and subsequently canceled, with the clock being entered normally, such state is state of the normal operation. During this normal operation, the external power-on reset signal PRSTB is 'H' and the clock stop detection signal CALMB is H, that is, the output of the inverter circuit 4 is 'L', so that the output OUTB of the latch circuit 2 is 'L'. Consequently, the OR gate circuit 6 is directly outputting the reset trigger signal CPURSTB. Since the OR gate circuit 8 is supplied with the clock stop detection signal CALMB in the 'H' state, the output RSTB2 of the OR gate circuit 8 remains 'H' without dependency on the state of the reset trigger signal CPURSTB.

If now the reset trigger signal CPURSTB is asserted from the PIO port of the processor 22 to the reset circuit 1, the output of the OR gate circuit 6 takes on the level 'L'. Thus, the output of the inverter circuit 7 takes on the level 'H', and 'H' is entered to the input terminal IN of the reset extension circuit 3.

The reset extension circuit 3 detects transition from 'H' to 'L' of the reset trigger signal CPURSTB, with the rise of the clock CLK, and outputs 'H' to the output terminal OUT of the reset extension circuit 3. With the transition for 'H' to 'L' of the reset trigger signal CPURSTB, the counter circuit 32, provided to the reset extension circuit 3, starts to count up or count down and, after lapse of prescribed period of time, 'L' is output at the output terminal OUT.

Finally, the AND gate circuit 10 outputs 'L' as a reset output signal RSTB, until after lapse of a prescribed period of time as from transition from 'H' to 'L' of the reset trigger signal CPURSTB. That is, the reset output signal RSTB is prohibited from being asserted until such time that the reset extension circuit 3 commences the reset extension, thereby to prevent the occurrence of a phenomenon in which the differentiating circuit 31 is unable to detect the rise edge or a phenomenon in which the reset output signal RSTB is once asserted but transiently negated so as to be again asserted, in order to effect reliable assertion of the reset output signal RSTB.

Since the reset output signal RSTB takes on the level 'L' in this manner after the reset extension circuit 3 has detected the inputting of the reset trigger signal CPURSTB, there is no risk of occurrence of unstable operations such that the reset output signal RSTB becomes momentarily negated. On the other hand, no reset is entered to e.g., the processor 22 until such time the reset extension circuit 3 detects the reset trigger signal CPURSTB. Hence, the change of a constant for a pull-up resistor, as required in a conventional circuit, may be dispensed with in the reset circuit 1 of the instant embodiment.

(2) The operation in which the clocks are stopped during the normal operation will now be explained.

If the clocks are stopped during the normal operation, that is, in case the external power-on reset signal PRSTB is 'H' and the clock stop detection signal CALMB is 'L', the output of the NAND gate 5 transitions from 'L' to 'H'. Thus, the clear signal C of the reset extension circuit 3 is asserted to 'H', such that the reset extension circuit 3 is initialized and the output OUT is 'L', with the output RSTB1 becoming fixed at 'H'. The output OUTB of the latch circuit 2 is also fixed at 'L'. If 'L' is entered as the reset trigger signal CPURSTB, the output of the OR gate circuit 6 takes on the level 'L', because the output of the latch circuit 2 is 'L'. The output of the OR gate circuit 8 also takes on the level 'L' because the clocks are stopped and hence the clock stop detection signal CALMB is 'L'.

That is, the reset trigger signal CPURSTB is passed through the OR gate circuits 6 and 8 and sent to the AND gate circuit 10 so as to be directly output as reset output signal RSTB. That is, when the clocks are stopped, the reset trigger signal CPURSTB is passed in a through fashion and output as the reset output signal RSTB. Since a reset is entered to the processor 22 the instant that the 'through' output is asserted as reset output signal RSTB, the reset trigger signal CPURSTB then gradually takes on the level 'H' by the pull-up resistor 29.

Figure 3:
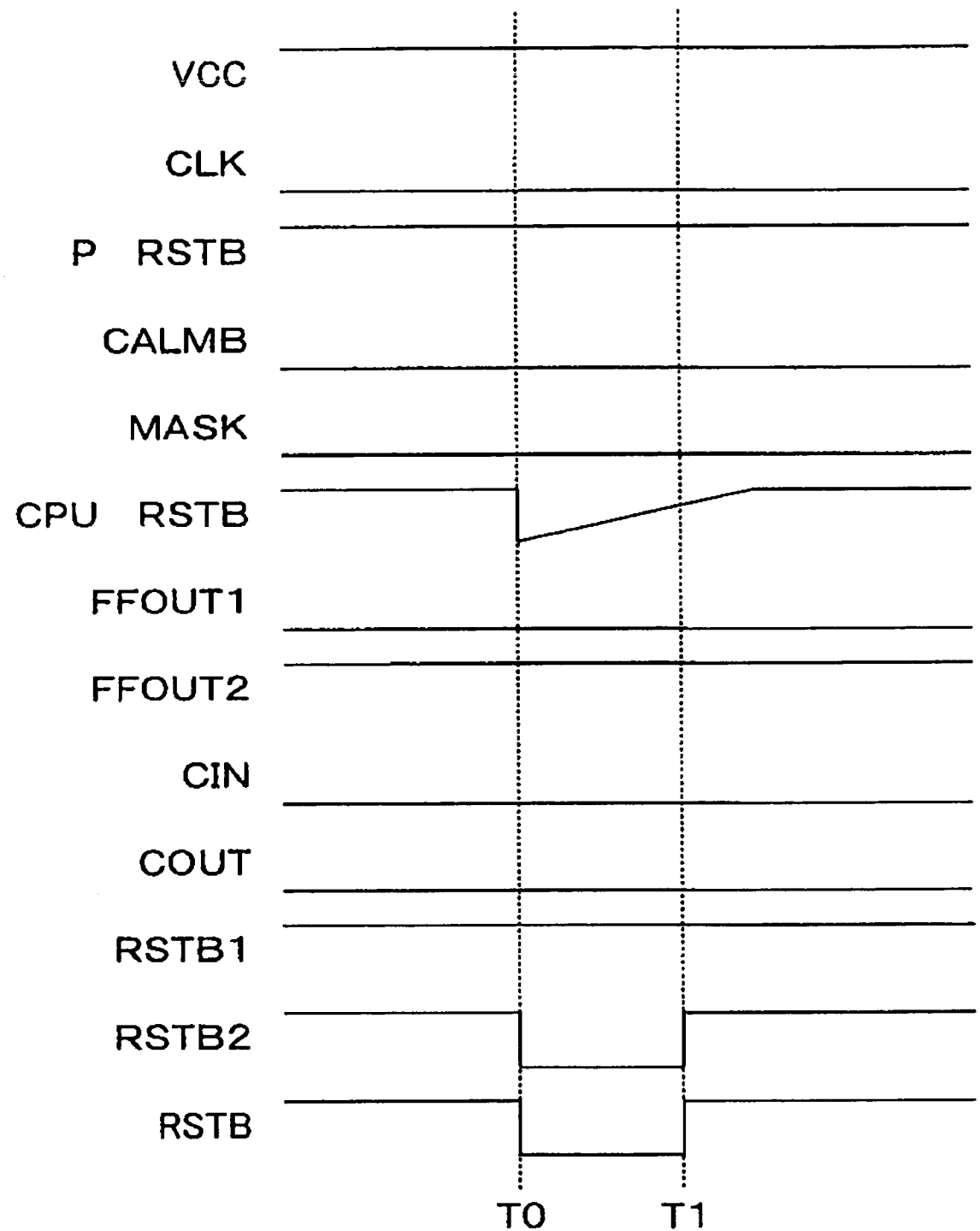
FIG. 3 is a timing chart for illustrating the operation of the reset circuit 1 embodying the present invention.

The operation of the reset circuit 1 in case the clocks are stopped during the normal operation is shown by a timing chart of FIG. 3.

First, since the clock stop detection signal CALMB is 'L', the reset extension circuit 3 continues its initialized state, so that, as long as the clocks are stopped, the output RSTB1 is 'H' at all times. Since 'L' is output by the latch circuit 2 as the mask signal MASK, the OR gate circuit 6 is set to 'through'. Since the clock stop detection signal CALMB is 'L', the OR gate circuit 8 is also set to 'through'. Hence, when the reset trigger signal CPURSTB is asserted at a timing of T0, the reset output signal RSTB instantaneously takes on the level 'L', thus resetting respective devices in the package 28, inclusive of the processor 22, which are asserting the reset trigger signal CPURSTB. The output at the PIO port of the processor 22 is initialized to its input by the assertion of the reset output signal RSTB, and hence transitions gradually to 'H' by the external pull-up resistor 29. At a timing of T1, when the reset trigger signal CPURSTB has reached a level 'H' that can be recognized by the reset circuit 1, the reset output signal RSTB takes on the level 'H'. This timing of T1 may differ with the constants of the pull-up resistor 29 or with capacitances of various devices.

Figure 4:
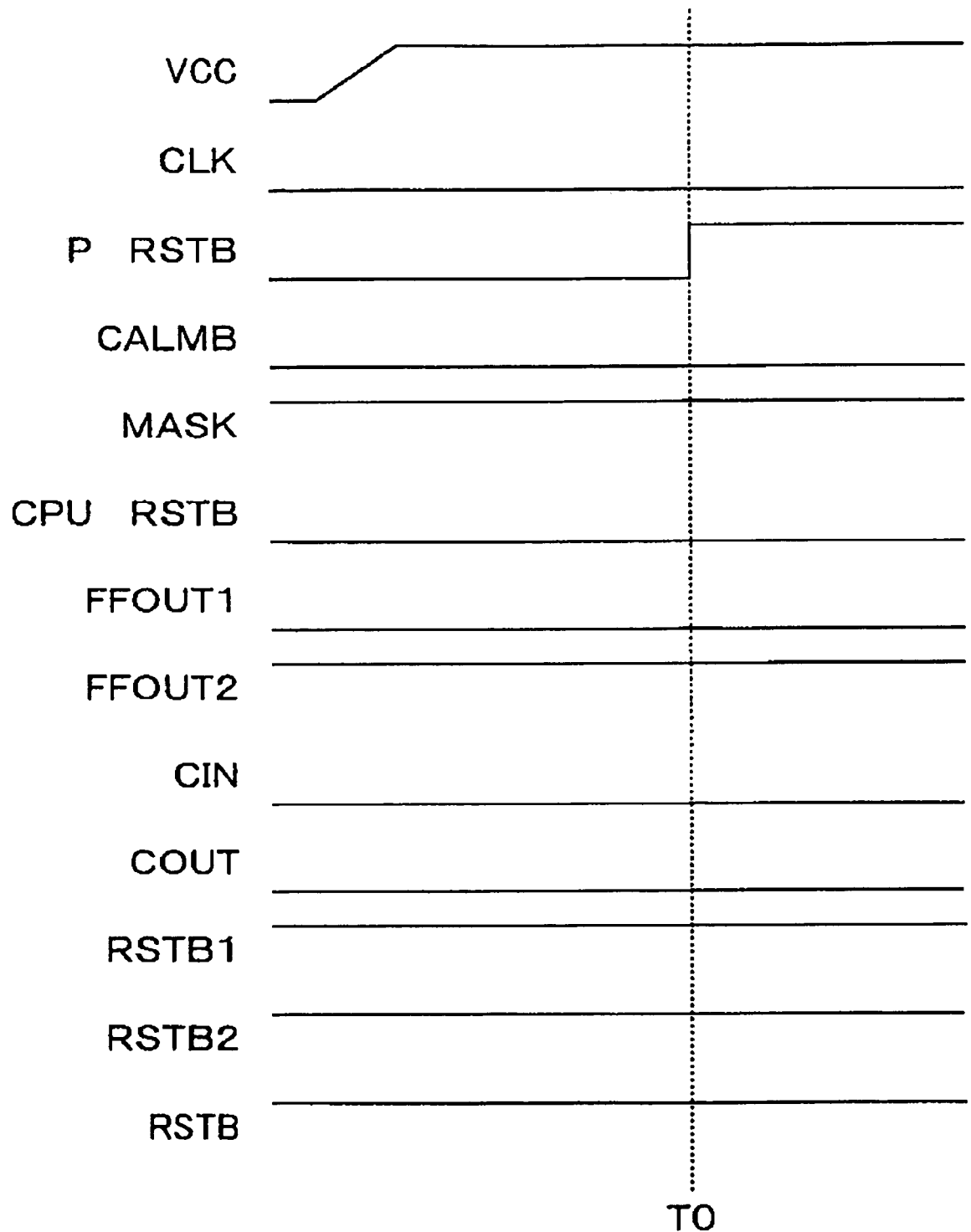
FIG. 4 is a timing chart for illustrating the operation of the reset circuit 1 embodying the present invention.

(3) Finally, the case where clock input is stopped on power up will be explained with reference to the timing chart of FIG. 4.

Under such a condition that, when the external power-on reset signal PRSTB is changed at timing of T0 from 'L' to H, the clock stop detection signal CALMB is 'L', that is, the clock input is continuously stopped as from the time of power up due e.g., to malfunctions, the mask signal MASK, output from the output terminal OUTB of the latch circuit 2, remains in the 'H' level. Consequently, the reset trigger signal CPURSTB is masked by the mask signal MASK in the OR gate circuit 6. Since the output of the NAND gate 5 takes on the level 'H', and 'H' is entered as the clear signal C of the reset extension circuit 3, the output OUT is initialized to 'L'.

Thus, even in such a case where the PIO port of the processor 22 has become an output port, with the reset trigger signal CPURSTB remaining in the asserted state, the reset output signal RSTB, masked by the OR gate circuit 6, does not keep on to be asserted, but keeps on to be negated. Consequently, even in such a case that the clocks are already stopped on power up, the resetting of the status monitor unit 20 can be canceled.

In the reset circuit 1 of the present embodiment, supplied with the PIO port output of the processor 22 as an input, as the reset trigger signal CPURSTB, the respective devices in the package 28 may be initialized, as the reset extension is reliably executed without adjusting the constant of the pull-up resistor 29, during the normal operation, by the operations explained above in (1) to (3). Such a reset circuit may be implemented in which, when the clocks are stopped during the normal operation, reset extension is discontinued to output the reset trigger signal input itself and, when the clocks are stopped on power up, the reset trigger signal input itself is masked to avoid using the unstable state of the PIO port as the reset trigger signal input.

In the foregoing explanation of the present embodiment, it is assumed that the reset trigger signal CPURSTB, external power-on reset signal PRSTB and the clock stop detection signal CALMB are active low signals. However, the present invention is not limited to the above-described embodiments and may similarly be applied without dependency on how active low signals or active high signals are used for various signals.

INDUSTRIAL UTILIZABILITY

According to the present invention, the following meritorious effects may be achieved.

(1) The reset trigger signal, input from a PIO port of a processor, for example, may reliably be detected to extend the reset signal, irrespective of constants of the external pull-up resistor or pull-down resistor or the capacitance values of various devices. Moreover, the reset signal can be asserted reliably for a predetermined time without performing such reset extension in which the reset signal is asserted and then transiently negated, even for a short time, so as to be then again asserted. Thus, it becomes possible to prevent the package from performing an unpredictable operation due to short-time negation liable to be produced in a conventional circuit.

(2) Such a function may be achieved in which, when the clocks are stopped, the reset extension is stopped and a through-signal which is not the extended reset trigger signal is output. If the clocks are stopped on power up, the reset trigger signal is masked, so that, in case e.g., the processor is unable to initialize correctly the circuit in the vicinity of the PIO port due to the absence of clocks on power up, such that input/output settings and output values become fixed in destabilized states, inputs from the PIO port of e.g., the processor may be masked by the reset circuit to negate the reset signal to permit the operation of the status monitor unit for the packages.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A reset circuit supplied with a reset trigger signal output from a general-purpose input/output port of a processor to generate a reset output signal to output said reset output signal to other circuits inclusive of said processor, said reset circuit comprising:

first mask means for masking said reset trigger signal, supplied thereto as an input, during the time which elapses after an external power-on reset signal indicating the current power supply state indicates power supply on until a clock stop detection signal indicating the operating state of clocks indicates for the first time that the clocks are operating normally;

a reset extension circuit for detecting an edge of the reset trigger signal as entered from said first mask means when the reset trigger signal becomes asserted and for generating and outputting a signal which becomes asserted for a prescribed period of time as from said edge;

initializing means for initializing said reset extension circuit in case said external power-on reset signal indicates power supply off, or in case said clock stop detection signal indicates that said clocks are stopped;

second mask means for masking said reset trigger signal from said first mask means in case said clock stop detection signal indicates that the clocks are operating normally; and reset output signal generating means for setting said reset output signal to an asserted state in case one of said signal from said reset extension circuit and the reset trigger signal from said second mask means is in an asserted state.

2. The reset circuit as defined in claim 1 wherein said first mask means comprises:

an inverter circuit supplied with said clock stop detection signal to output a complemented signal of said clock stop detection signal, said clock stop detection signal being such a signal transitioning to a high level for indicating the normal operating states of the clocks and to a low level when the clocks are stopped;

a latch circuit supplied with said external power-on reset signal as a reset input and with an output of said inverter circuit at an input terminal, said latch circuit outputting a high level signal at an output terminal, without dependency upon the value of the signal input to said input terminal, when said external power-on reset signal is at a low level indicating the power supply off state, said latch circuit continuing to output a low level signal at said output terminal when a low level signal is entered to said input terminal even once in case said reset input is at a high level; and an OR gate circuit supplied with said reset trigger signal which is at a low level in an asserted state and with a signal output from said output terminal of said latch circuit to perform logical sum operations thereon to output the result thereof.

3. The reset circuit as defined in claim 2 wherein said second mask means is formed by logical sum operating means performing logical sum operations on an output of said OR gate circuit and said clock stop detection signal to output the results thereof to said reset output signal generating means.

4. The reset circuit as defined in claim 2 wherein said initializing means is formed by a NAND gate circuit supplied with said external power-on reset signal and with said clock stop detection signal as inputs to perform the operations of finding an AND thereof and inverting said AND to send the result of the operations to an asynchronous clear input of said reset extension circuit.

5. The reset circuit as defined in claim 3 wherein said initializing means is formed by a NAND gate circuit supplied with said external power-on reset signal and with said clock stop detection signal as inputs to perform the operation of finding an AND thereof and inverting said AND to send the result of the operations to an asynchronous clear input of said reset extension circuit.

6. A digital communication apparatus comprising a plurality of packages, each including a processor, and an upper order state monitor unit for monitoring the states of said packages, wherein said packages each comprise:

a status monitor unit for reporting the states of said packages to said upper state monitor unit;

a power supply monitor circuit for monitoring the power supply voltage of said packages, for negating an external power-on reset signal in case the power supply voltage is not lower than a prescribed value, and for asserting said external power-on reset signal in case the power supply voltage is lower than said prescribed value;

a processor for outputting a reset trigger signal for initializing said packages, using a general-purpose input/output port, in case the operation of said packages is destabilized or in case renewed setting of said packages has become necessary;

a clock monitor device for monitoring clock signals supplied to each circuit in each package to output a clock stop detection signal which is in a negated state when said clock signals are operating normally, said clock stop detection signal being in an asserted state when said clock signals are stopped; and a reset circuit formed by first mask means for masking said reset trigger signal, supplied thereto as an input, during the time after said external power-on reset signal has become negated and until said clock stop detection signal has become negated for the first time, a reset extension circuit for detecting an edge of the reset trigger signal as entered from said first mask means when the reset trigger signal becomes asserted and for generating and outputting a signal which becomes asserted for a prescribed period of time as from said edge, initializing means for initializing said reset extension circuit when said external power-on reset signal has become asserted or when said clock stop detection signal has become asserted, second mask means for masking the reset trigger signal from said first mask means when said clock stop detection signal has become asserted, and reset output signal generating means for setting said reset output signal to an asserted state in case one of said signal from said reset extension circuit and the reset trigger signal from said second mask means is in an asserted state;

said reset circuit generating said reset output signal and outputting the generated reset output signal to other circuits inclusive of said processor.

7. The digital communication apparatus as defined in claim 6 wherein said first mask means comprises:

an inverter circuit supplied with said clock stop detection signal to output a complemented signal of said clock stop detection signal, said clock stop detection signal being such a signal transitioning to a high level for indicating the normal operating states of the clocks and to a low level when the clocks are stopped;

a latch circuit supplied with said external power-on reset signal as a reset input and with an output of said inverter circuit at an input terminal, said latch circuit outputting a high level signal at an output terminal, without dependency upon the value of the signal input to said input terminal, when said external power-on reset signal is at a low level indicating the power supply off state, said latch circuit continuing to output a low level signal at said output terminal when a low level signal is entered even once to said input terminal in case said reset input is at a high level; and an OR gate circuit supplied with said reset trigger signal which is at a low level in an asserted state and with a signal output from said output terminal of said latch circuit to perform logical sum operations thereon to output the result thereof.

8. The digital communication apparatus as defined in claim 7 wherein said second mask means is formed by logical sum operating means performing logical sum operations on an output of said OR gate circuit and said clock stop detection signal to output the results thereof to said reset output signal generating means.

9. The digital communication apparatus as defined in claim 7 wherein said initializing means is formed by a NAND gate circuit supplied with said external power-on reset signal and with said clock stop detection signal as inputs to perform the operation of finding an AND thereof and inverting said AND to send the result of the operations to an asynchronous clear input of said reset extension circuit.

10. The digital communication apparatus as defined in claim 8 wherein said initializing means is formed by a NAND gate circuit supplied with said external power-on reset signal and with said clock stop detection signal as inputs to perform the operation of finding an AND thereof and inverting said AND to send the result of the operations to an asynchronous clear input of said reset extension circuit.

* * * * *